Patented Aug. 19, 1941

2,253,274

UNITED STATES PATENT OFFICE 2,253,274

METHOD OF MAKING PIGMENTS

Joseph C. Heckman, Pittsburgh, Pa., assignor to Potter Title and Trust Company, Pittsburgh, Pa., a corporation of Pennsylvania No Drawing. Application June 3, 1940, Serial No. 338,557

10 Claims. (Cl. 106—304)

My invention relates to the manufacturing of iron-containing pigments such as are employed in coloring or tinting, or as polishing rouges, or as pigment fillers in rubber, paper, plastics, etc.

The invention has for its object the making of iron oxide pigment products of high quality and greatly improved shades and brilliancy of colors. These pigments can be produced by me largely from waste materials that contain high percentages of iron.

In its preferred embodiment, my invention includes the use of iron sulphates such as can be made from any finely divided iron, with which I mix a cyanogen-bearing material and then calcine the mixture that will then be ground to a fine powder.

The sulphates of iron preferably will be made from an iron sludge such as the iron sludge that is discarded in the making of aniline oil and kindred products; sludge or mud such as settle or are precipitated from water drainage of coal mines—commonly called coal mine sulphur mud; copperas; blast furnace flue dust; pyrites cinder obtained from iron pyrites, after removal of the sulphur by burning, or the like.

Finely divided iron may also be used in the form of hydrated oxide of iron or iron ore, after being changed into the form of a sulphate.

In practicing my invention, I employ a cyanate or cyanides, or other cyanogen-bearing material, such as sodium cyanide, potassium cyanide, amonium cyanide, sodium ferro cyanide, potassium cyanide, the various ferri cyanides and sulpho cyanides, cyanimid, spent oxides from artificial gas manufacturing plants, and also spent oxides that result from the purification of natural gas which contains sulphur. One or more of these materials is mixed with sulphates of iron, the cyanide ingredient preferably constituting .1% to 6% of the weight of the iron. The percentage of cyanide or the like which is employed is varied in accordance with the shade and depth of color desired. Larger percentages of cyanide will produce deeper and brighter red colors.

The sulphate of iron can be made by treating finely divided iron with sulphuric acid, in a proportion of from 25% upwards, of the weight of the iron.

Some of the materials such as copperas and coal mine mud which are in a sulfated condition will not require additional sulphuric acid, but others such as pyrites cinder, aniline sludge, iron ore and flue dust will require the addition of sulphuric acid or sulphur and an acid, in order to convert them into sulphates of iron.

The cyanogen-bearing material is added to the iron sulphate. The cyanide material is preferably first dissolved in a small amount of water and then introduced into and thoroughly mixed with the sulphate of iron.

The mixture of sulphate of iron and the cyanogen material is then calcined by gradually heating it to a temperature of from 1000 F. to 1500 F. The higher temperatures will give deeper shades to the finished product. From one hour to five hours or more will be required for calcining a one-ton mixture to the desired color. The longer periods of heating will produce deeper color in the mixture than shorter periods. After calcining, the mixture is ground to an impalpable powder and is then ready for use as a red pigment for paint, filler, polishing rouge etc.

In addition to or as alternative of the use of cyanogen-bearing materials with the sulphates of iron, I find it advantageous, when a blue-toned red color is desired in the pigment, to incorporate in the mixture spent oxides of iron from artificial gas manufacturing plants, which oxides are usually of approximately the following composition:

| | Per cent |
|---|---|
| Ferric oxide | 26.71 |
| Sulphur | 48.56 |
| Cyanides | 4.64 |
| Tar | 4.11 |

The said spent oxides usually contain sufficient cyanide-bearing material to render unnecessary the use of additional cyanide. The spent oxide is incorporated with the sulphates of iron, in percentages of from .2% upwards, by weight of the entire mixture, and the resulting mixture is then properly calcined and ground as in the case of the sulphates of iron and other cyanide materials.

In cases where there is a deficiency of cyanide in said spent oxides, some cyanide must be added, to make up this deficiency. The spent oxides may be employed with iron sulphate in percentages of from less than 1% up to 50% of the total weight of the mixture. Percentages of spent oxide above 50% will not produce very high quality in the way of color and tinting strength, but will be acceptable for some classes of pigments.

The said spent oxides contain sulphur as well as cyanide, and the sulphur is useful in that it gives a medium class red tone.

It is not essential that sulphates of iron be employed in connection with the cyanogen-bearing material, because I may take any finely-divided iron such as pyrites cinder, flue dust, aniline sludge, hydrated iron oxide or iron ore and mix therewith sulphur, sulphuric acid 25% of the weight of the iron, and a cyanogen-bearing material, and by calcining the same, secure the improved tone or color that results from the use of the cyanogen-bearing material.

The term "cyanogen-bearing material" is employed in a broad sense in the accompanying claims, to include the various materials of a cyanide nature and their related substances, as heretofore referred to. Sulphur pyrites recited in certain of the claims refers to iron pyrites before the sulphur has been removed therefrom by burning it to produce the pyrites cinder heretofore referred to. It will sometimes be used as a source of sulphur for the mixture.

I claim as my invention:

1. The method of making pigment material, which comprises calcining a mixture containing sulphate of iron and a cyanogen-bearing material.

2. The method of making pigment material, which comprises calcining a mixture containing sulphate of iron and a cyanogen-bearing material, the sulphate of iron constituting 94% to 99.9% of the mixture, and the cyanogen constituting .1% to 6% thereof, by weight.

3. The method of making pigment material, which comprises calcining a mixture containing sulphate of iron and a cyanogen-bearing material, the cyanogen constituting not substantially less than .1% of the mixture, by weight.

4. The method of making pigment material, which comprises calcining a mixture containing a sulphate of iron, sulphur and a cyanogen-bearing material.

5. The method of making pigment material, which comprises calcining a mixture containing pyrites cinder, sulphuric acid and a cyanogen-bearing material.

6. The method of making pigment material, which comprises calcining a mixture comprising sulphur pyrites, sulphuric acid, and pyrites cinder, in combination with a cyanogen-bearing material.

7. The method of making iron-containing pigment material, which comprises calcining a mixture of a sulphate of iron, sulphur and a cyanogen-bearing material, the cyanogen and sulphur combined being from .1% to 6% of the weight of the mixture.

8. The method of making iron-containing pigment material, which comprises calcining a mixture of a sulphate of iron, sulphur and a cyanogen-bearing material, the cyanogen and sulphur combined being not less than .1% of the weight of the mixture.

9. The method of making iron-containing pigment material, which comprises calcining a mixture containing finely-divided iron, sulphuric acid and a cyanogen-bearing material.

10. The method of making iron-containing pigment material, which comprises calcining a mixture containing pyrites cinder, treated with sulphuric acid in quantity up to the theoretical requirement for forming sulphate of iron, sulphur not less than approximately 10% of the weight of the iron, and a cyanogen-bearing material.

JOSEPH C. HECKMAN.